United States Patent [19]

Mitsopoulos et al.

[11] 4,366,266

[45] Dec. 28, 1982

[54] BINDER COMPOSITIONS AND PROCESS FOR MAKING MOLDED PRODUCTS THEREWITH

[75] Inventors: Tom Mitsopoulos, Toronto; Satish Jhaveri, Oakville; Charles Lui, Mississauga, all of Canada

[73] Assignee: Valvoline Oil & Chemicals Ltd., Mississauga, Canada

[21] Appl. No.: 283,262

[22] Filed: Jul. 14, 1981

[30] Foreign Application Priority Data

Feb. 5, 1981 [GB] United Kingdom ............... 8103522

[51] Int. Cl.$^3$ .................. B22C 1/22; B22C 9/02; B28B 7/34; C08L 91/00

[52] U.S. Cl. ............................. 523/143; 164/16; 164/521; 164/526; 164/527; 523/146

[58] Field of Search ............. 260/19 A, 19 N, 19 R; 164/16, 521, 526, 527; 523/143, 146

[56] References Cited

U.S. PATENT DOCUMENTS

| | | | |
|---|---|---|---|
| 2,987,789 | 6/1961 | Morén | 164/16 |
| 3,255,500 | 6/1966 | Engel et al. | 164/526 |
| 3,409,579 | 11/1968 | Robins | 528/153 |
| 3,426,831 | 2/1969 | Robins et al. | 164/526 |
| 3,428,110 | 2/1969 | Walker et al. | 164/16 |
| 3,485,797 | 12/1969 | Robins | 528/153 |
| 3,767,612 | 10/1973 | Grazen et al. | 260/19 A |
| 4,043,954 | 8/1977 | Claybaker | 260/19 A |
| 4,252,700 | 2/1981 | Funabiki et al. | 164/521 |
| 4,268,425 | 5/1981 | Gardikes | 164/16 |

*Primary Examiner*—Ronald W. Griffin
*Attorney, Agent, or Firm*—Robert F. Delbridge; Arne I. Fors

[57] ABSTRACT

A binder composition for making molded products in conjunction with an aggregate includes in admixture a resin component comprising an organic solvent solution of a non-aqueous phenolic resin, a hardener component comprising a liquid polyisocyanate containing at least two isocyanate groups, the resin component and hardener component being curable by a curing agent, and an additional component comprising an oil-soluble phenolic resin dissolved in a drying oil and partially cross-linked therewith.

29 Claims, No Drawings

BINDER COMPOSITIONS AND PROCESS FOR MAKING MOLDED PRODUCTS THEREWITH

This invention relates to binder compositions suitable for use in making foundry products for metal castings or similar products.

In the manufacture of metal articles by casting in a foundry, a foundry product is made by mixing an appropriate binder composition with an aggregate such as sand, shaping the mixture in a mold, and curing the mixture so that a self-supporting foundry product is formed.

Although for many years it was necessary to apply heat in carrying out the curing step, binder compositions have recently been developed which can be cured at room temperatures, with such an improvement representing a very significant advance in the art. Methods employing such binder compositions have become known as no-bake or cold box systems.

For example, U.S. Pat. No. 3,409,579 issued Nov. 5, 1968 described a binder composition which can be cured at room temperature, that is to say without the application of heat being required. The binder composition comprises a resin component, a hardener component and a curing agent. The resin component comprises an organic solvent solution of a non-aqueous phenolic resin, the hardener component comprises a liquid polyisocyanate containing at least two isocyanate groups, and the curing agent comprises a tertiary amine. A preferred resin is described in U.S. Pat. No. 3,485,797 issued Dec. 23, 1969.

A foundry mix is formed by mixing a binding amount of the resin component and the hardener component with aggregate containing sand as a major constituent, the binding amount of resin component and hardener component being up to 10% of the weight of the aggregate. The foundry mix is then shaped in a mold and cured by passing the tertiary amine curing agent as a gas through the foundry mix. The tertiary amine curing agent catalyzes a cross-linking reaction at room temperature between the phenolic resin component and the isocyanate hardener component to produce a solid polymer with the result that a self-supporting foundry product is formed in a relatively short time, which may be as little as one to four seconds.

Such no-bake or cold box systems which are curable at room temperature provide a significant advance in the art in comparison to prior systems in which heat was required in the curing step, and no-bake or cold box systems such as described in the above mentioned U.S. patents have achieved considerable commercial success. However, with such systems, there are still improvements to be made. For example, the foundry product may experience an unacceptable loss of strength when stored under conditions of high humidity. Also, rapid loss of strength may occur when the foundry product is immersed in water-based refractory washes and subsequently dried in an oven. This procedure may be carried out when the foundry product is used for metal casting in order to reduce the likelihood of metal penetrating into the casting or the aggregate (usually sand) burning onto the metal. It will thus be advantageous if strength retention in such circumstances could be improved.

The reason for such loss of strength is not completely understood, but one theory is as follows. It is believed that the mixed phenolic resin and isocyanate hardener coating the grains of the aggregate are polymerized during the curing step to form bridges at the points of contact between individual grains of aggregate, the polymer bridges being bonded to the aggregate grains, thereby forming a cohesive mass. During this process however, solvent is expelled from the polymerizing mass so that the resin does not continuously coat the grains of the aggregate. When the solvent evaporates, moisture can penetrate into the cohesive mass and migrate into the areas of the discontinuities or gaps in the polymerized resin film. Over a period of time, this moisture may progressively penetrate between the surface of the grains and the adhering polymerized resin, thereby weakening the bond. It is emphasized that this is a possible explanation.

Also, such prior art foundry products may have poor mold release characteristics due to the cured resin adhering to the mold surface. Such foundry products may also have relatively low immediate strength, that is to say strength immediately after formation in the mold, thereby necessitating proportionately high levels of the resin in the aggregate to enable the cured foundry product to be handled satisfactorily on ejection from the mold. Again, it would be advantageous if improvements could be made in mold release characteristics and immediate strengths.

The present invention is based on the discovery that one or more of the above improvements are made if an additional component comprising an oil-soluble phenolic resin dissolved in a drying oil and partially cross-linked therewith is incorporated in the binder composition.

A drying oil is an oxidative oil, that is to say an unsaturated oil with double bonds. A possible explanation of the invention is that, during the curing step, the polymerizing mass formed by the resin component and the hardener component expels the additional component to the periphery of the polymer bridges, and that firstly the drying oil in the additional component cross-links slightly with the isocyanate of the hardener component. The drying oil constituent of the additional component then dries out, and it is also believed that the phenolic resin constituent of the additional component becomes cross-linked with the isocyanate of the hardener component to substantially eliminate the possibility of gaps being left in the polymerized resin film coating the grains of aggregate with the result that water cannot penetrate between the polymer bridges and the aggregate grains to weaken the bond therebetween. Again, it is emphasized that this is a possible explanation.

It has been found that, by using this additional component, foundry products or similar products can be stored in humid conditions where, without the additional component, loss of strength would occur. Also, foundry products produced by using the additional component can be immersed in water-based refractory coatings and subsequently dried in an oven without significant loss of strength, thereby substantially reducing the breakage experienced with foundry products produced without the additional component. Use of the additional component may also reduce the likelihood of distortion which may occur with such treatment.

The present invention may also provide other advantages. For example, the additional component may improve the flowability of the sand when the binder composition is mixed therewith to enable denser foundry products to be produced, this being an advantage in metal casting. Additionally, the foundry product may be more easily releasable from the mold. The additional component may also improve the immediate strength of the foundry product, probably because of the cross-linking of the phenolic resin of the additional component with the isocyanate hardener component.

The present invention accordingly provides a binder composition including in admixture a resin component comprising an organic solvent solution of a non-aqueous phenolic resin, a hardener component comprising a liquid polyisocyanate containing at least two isocyanate groups, the resin component and hardener component being curable by a curing agent, and an additional component comprising an oil-soluble phenolic resin dissolved in a drying oil and partially cross-linked therewith.

The resin component, hardener component and curing agent may be as described in the previously mentioned U.S. patents.

Advantageously, the phenolic resin of the additional component is a condensation product of a phenol having the general formula

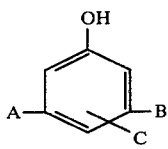

wherein A, B and C are hydrogen, hydrocarbon radicals, oxyhydrocarbon radicals or halogen, with an aldehyde having the general formula RCHO wherein R is a hydrogen or a hydrocarbon radical of 1 to 8 carbon atoms.

The amount of additional component may be from about 1 to about 20% by weight of the resin component, more preferably from about 1 to about 10% by weight of the resin component.

The drying oil may comprise at least one of the group consisting of castor oil, tung oil, linseed oil, oiticica oil, safflower oil and soybean oil. The drying oil may comprise a mixture of castor oil and tung oil and may comprise from about 3 to about 4 parts by weight of castor oil to one part of tung oil.

The additional component may have a viscosity at about 25° C. in the range of from about E to about M, preferably from about G to about K, on the Gardner-Holdt bubble viscosimeter scale.

The present invention also provides a molding composition comprising a major amount of aggregate, and an effective bonding amount of up to about 40% by weight of the binder composition referred to above.

According to a further aspect of the invention, a process for making a molded product includes providing a first resin component including an organic solvent solution of a non-aqueous phenolic resin, providing a second hardener component comprising a liquid polyisocyanate containing at least two isocyanate groups, providing a third additional component comprising an oil-soluble phenolic resin dissolved in a drying oil and partially cross-linked therewith, mixing aggregate with a binding amount of the first resin component and the second hardener component and with the additional component to provide a mix, shaping the mix in a mold, curing the mix in the mold by means of a curing agent to form a molded product, and removing the molded product from the mold.

The mix may be cured by passing a gaseous curing agent through the mix, and the gaseous curing agent may comprise a tertiary amine. Alternatively, the curing agent may comprise a liquid catalyst mixed with the molding composition.

The phenolic resin of the additional component may be a novolac or resole resin, and the phenolic resin of the resin component may be a polybenzylic ether resin which is not oil soluble. The phenolic resin of the additional component may be the same resin as that in the resin component if it is an oil soluble phenolic resin.

According to one embodiment of the invention, an additional component comprises a phenolic resin dissolved in and partially cross-linked with a mixture of dehydrated castor oil and tung oil (Chinawood oil), the solution being thinned with a suitable organic solvent such as mineral spirits. The additional component is prepared by adding crushed phenolic resin to preheated dehydrated castor oil, with the tung oil being added subsequently with application of further heat to effect partial cross-linking between the phenolic resin and the castor oil and the tung oil. Preferably, the amount of phenolic resin used is from about 10 to about 30% by weight of the total weight of resin and drying oil. Mineral spirits are then added to reduce the viscosity of the solution to a suitable value.

To produce a foundry product, the additional component is mixed with a resin component comprising an organic solvent solution of a non-aqueous phenolic resin, which may be the same phenolic resin as in the oil component, and a hardener component comprising liquid polyisocyanate containing at least two isocyanate groups. The resultant mixture is mixed with sand aggregate, and the mix is shaped in a mold. Curing agent in the form of tertiary amine gas is then blown therethrough at room temperature. Within seconds, cross-linking between the resin component and hardener component occurs to provide a self-supporting product.

The additional component provides resistance to loss of self-supporting strength under humid atmospheric conditions, the believed behaviour of the additional component in this respect having been previously described. Such behaviour usually takes place slowly at ambient temperatures, for example about 4 hours, but may be accelerated by the application of heat, for example the heat used for drying after immersion in water-based refractory coatings.

A specific example of the invention will now be described.

To prepare an additional component, 17,077 pounds of bodied dehydrated castor oil was preheated to 180° C., and air was sparged therethrough at 5 cfm. 3,369 pounds of pre-crushed phenolic resin was then immediately added, followed by 5,555 pounds of tung oil, the solution then being heated to 230° C. The solution was maintained at 230° C. for about 1 hour to effect partial cross-linking of the resin with dehydrated castor oil and tung oil, and then cooled to 150° C. The cooled solution was then discharged into 16,333 pounds of mineral spirits to produce an additional component with a viscosity at 25° C. in the range of G to K on the Gardner-Holdt scale (equivalent to 36,000 to 64,000 cps on the Brookfield Scale).

Tests were then carried out to compare foundry products in which the additional component had been used with foundry products in which no such additional component had been used. The amount of additional component added was 10% by weight of the resin component, and the procedure followed with respect to the production of the foundry products was otherwise as described in the previously mentioned U.S. patents. The additional component was not miscible with the resin component or the hardener component. It is believed that this is due to the partial cross-linking of the phenolic resin with the castor oil and tung oil in the additional component.

The tensile strength of the resultant foundry products with and without the additional component was measured immediately after being released from the mold (0 mins), after 8 mins, after 1 hour and after 24 hours. Each foundry product was then placed in a foundry atmosphere with humid conditions for 24 hours, and the tensile strength measured at the end of this time.

The results of the tests are as follows, the tensile strength being shown in psi.

|  | 0 mins | 8 mins | 1 hr | 24 hr | after 24 hrs humid atmos. |
|---|---|---|---|---|---|
| No additional component | 167 | 212 | 243 | 335 | 70 |
| With additional component | 218 | 340 | 370 | 422 | 200 |

The significant improvement in the strength foundry products prepared in accordance with the invention when subjected to humid conditions is readily apparent. The foundry products produced in accordance with the invention also had better mold release characteristics, demonstrated by the fact that it was not necessary to use the release agents, or at least only greatly reduced amount of the release agents, which were necessary when no additional component was used.

Further foundry products with and without the additional component were produced as before, except that immediately after release from the mold, each foundry product was baked for 10 minutes at 230° C. The tensile strength of each foundry product was then measured immediately after baking (0 mins), after 8 mins, after 1 hour and after 24 hours. Results of these tests are as follows:

|  | 0 mins | 8 mins | 1 hr | 24 hr |
|---|---|---|---|---|
| No additional component | 185 | 235 | 270 | 360 |
| With additional component | 270 | 390 | 410 | 470 |

It will therefore be seen that such baking significantly improves the strength of foundry products prepared in accordance with the invention.

Other embodiments and examples of the invention will be readily apparent to a person skilled in the art, the scope of the invention being defined in the appended claims.

What we claim as new and desire to protect by Letters Patent of the United States is:

1. A binder composition including in admixture a resin component comprising an organic solvent solution of a non-aqueous phenolic resin, a hardener component comprising a liquid polyisocyanate containing at least two isocyanate groups, said resin component and hardener component being curable by a curing agent, and an additional component comprising an oil-soluble phenolic resin dissolved in a drying oil and partially cross-linked therewith.

2. A binder composition according to claim 1 wherein the phenolic resin of the additional component comprises a condensation product of a phenol having the general formula

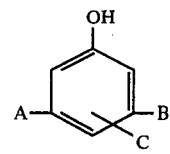

wherein A, B and C are hydrogen, hydrocarbon radicals, oxyhydrocarbon radicals or halogen, with an aldehyde having the general formula RCHO wherein R is a hydrogen or a hydrocarbon radical of 1 to 8 carbon atoms.

3. A binder composition according to claim 1 wherein the oil soluble phenolic resin of the additional component is selected from the group consisting of novolac and resole resins.

4. A binder composition according to claim 3 wherein the phenolic resin of the resin component is a polybenzylic ether resin.

5. A binder composition according to claim 1 wherein the amount of additional component is from about 1 to about 20% by weight of the resin component.

6. A binder composition according to claim 1 wherein the amount of additional component is from about 1 to about 10% by weight of the resin component.

7. A binder composition according to claim 1 wherein the drying oil comprises at least one of the group consisting of castor oil, tung oil, linseed oil, safflower oil, oiticica oil and soybean oil.

8. A binder composition according to claim 7 wherein the drying oil comprises a mixture of castor oil and tung oil.

9. A binder composition according to claim 8 wherein the drying oil comprises from about 3 to about 4 parts by weight of castor oil to 1 part of tung oil.

10. A binder composition according to claim 1 wherein the additional component has a viscosity at about 25° C. in the range of from about E to M on the Gardner-Holdt bubble viscosimeter scale.

11. A binder composition according to claim 10 wherein the additional component has a viscosity at about 25° C. in the range of from about G to about K on the Gardner-Holdt bubble viscosimeter scale.

12. A binder composition according to claim 1 wherein the additional component comprises partially cross-linked resin and drying oil dissolved in an aliphatic or aromatic solvent.

13. A binder composition according to claim 12 wherein the additional component comprises partially cross-linked resin and drying oil dissolved in mineral spirits.

14. A molding composition comprising a major amount of aggregate, and an effective bonding amount of up to about 40% by weight of the binder composition of claim 1.

15. A process for making a molded product comprising providing a first resin component comprising an organic solvent solution of a non-aqueous phenolic resin, providing a second hardener component comprising a liquid polyisocyanate containing at least two isocyanate groups, providing a third additional component comprising an oil-soluble phenolic resin dissolved in a drying oil and partially cross-linked therewith, mixing aggregate with a binding amount of the first resin component and the second hardener component and with the third additional component to provide a mix, shaping the mix in a mold, curing the mix in the mold by means of a curing agent to form a molded product, and removing the molded product from the mold.

16. A process according to claim 15 wherein the mix is cured by passing a gaseous curing agent through the mix.

17. A process according to claim 16 wherein the gaseous curing agent comprises a tertiary amine.

18. A process according to claim 15 wherein the phenolic resin is a condensation product of a phenol having the general formula

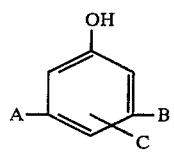

wherein A, B and C are hydrogen, hydrocarbon radicals, oxyhydrocarbon radicals or halogen, with an aldehyde having the general formula RCHO wherein R is a hydrogen or a hydrocarbon radical of 1 to 8 carbon atoms.

19. A process according to claim 15 wherein the oil-soluble phenolic resin of the additional component is selected from the group consisting of novolac and resole resins.

20. A process according to claim 19 wherein the phenolic resin of the resin component is a polybenzylic ether resin.

21. A process according to claim 15 wherein the amount of additional component is from about 1 to about 20% by weight of the resin component.

22. A process according to claim 15 wherein the amount of additional component is from about 1 to about 10% by weight of the resin component.

23. A process according to claim 15 wherein the drying oil comprises at least one of the group consisting of castor oil, tung oil, linseed oil, safflower oil, oiticica oil and soybean oil.

24. A process according to claim 15 wherein the drying oil comprises a mixture of castor oil and tung oil.

25. A process according to claim 24 wherein the drying oil comprises from about 3 to about 4 parts by weight of castor oil to 1 part of tung oil.

26. A process according to claim 15 wherein the additional component has a viscosity at about 25° C. in the range of from about E to about M on the Gardner-Holdt bubble viscosimeter scale.

27. A process according to claim 26 wherein the additional component has a viscosity at about 25° C. in the range of from about G to about K on the Gardner-Holdt bubble viscosimeter scale.

28. A process according to claim 15 wherein the additional component comprises partially cross-linked resin and drying oil dissolved in an aliphatic or aromatic solvent.

29. A process according to claim 28 wherein the additional component comprises partially cross-linked resin and drying oil dissolved in mineral spirits.

* * * * *